(12) United States Patent
Gupta et al.

(10) Patent No.: US 6,374,305 B1
(45) Date of Patent: Apr. 16, 2002

(54) WEB APPLICATIONS INTERFACE SYSTEM IN A MOBILE-BASED CLIENT-SERVER SYSTEM

(75) Inventors: Puneet Gupta, Sunnyvale; Philip Darringer, San Francisco; David LaMacchia, Foster City; Kenneth Harrenstien, Palo Alto, all of CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/569,935

(22) Filed: May 12, 2000

Related U.S. Application Data

(63) Continuation of application No. 08/897,780, filed on Jul. 21, 1997, now abandoned.

(51) Int. Cl.[7] .............................................. C06F 15/16
(52) U.S. Cl. ...................................... 709/246; 709/223
(58) Field of Search ........................... 705/52; 709/202, 709/203, 219, 227, 229, 246, 223; 717/1; 707/526

(56) References Cited

U.S. PATENT DOCUMENTS

| | | | | |
|---|---|---|---|---|
| 5,422,999 A | * | 6/1995 | Travis et al. ................. | 709/217 |
| 5,673,322 A | * | 9/1997 | Pepe et al. ..................... | 705/52 |
| 5,737,607 A | * | 4/1998 | Hamilton et al. .............. | 717/1 |
| 5,802,292 A | * | 9/1998 | Mogul ........................ | 709/203 |
| 5,850,517 A | * | 12/1998 | Verkler et al. .............. | 709/202 |
| 5,918,239 A | * | 6/1999 | Allen et al. ................. | 707/526 |
| 5,948,066 A | * | 9/1999 | Whalen et al. ............. | 709/229 |
| 5,978,847 A | * | 11/1999 | Kisor et al. ................. | 709/227 |
| 6,055,569 A | * | 4/2000 | O'Brien et al. ............. | 709/223 |
| 6,157,941 A | * | 12/2000 | Verkler et al. .............. | 709/223 |
| 6,161,123 A | * | 12/2000 | Renouard et al. ........... | 709/203 |
| 6,167,450 A | * | 12/2000 | Angwin et al. ............. | 709/227 |
| 6,185,625 B1 | * | 2/2001 | Tso et al. .................... | 709/247 |

\* cited by examiner

Primary Examiner—Dung C. Dinh
Assistant Examiner—Walter Benson
(74) Attorney, Agent, or Firm—Lyon & Lyon LLP (57) ABSTRACT

A mobile-based client-server system architecture incorporates two specialized software layers—a specialized "proxy" layer that resides on a mobile client station, and a "web agent" layer that resides on a server. A conventional web browser application residing on a mobile client station is configured to point to the proxy layer, which captures HTTP information request messages that are transmitted to, and received from, the web browser. The HTTP request messages are packed by the proxy layer within a selected communication transmission format for upstream transmission over a communication network, such as a wireless network. At the server, the web agent layer recovers the original, (i.e., "raw") HTTP request messages, which are then sent to an appropriate web server for further processing. Responsive HTTP messages transmitted from a respective web server are captured by the web agent layer, which packs the responsive messages within the selected communication transmission format for transmission to the client station. At the client station, the proxy layer recovers the raw HTTP response messages, which are then forwarded to the web browser for processing. The respective proxy and web agent layers preferably employ respective memory caches and have intelligent filtering capabilities, thereby reducing redundant or otherwise unwanted message transmission.

39 Claims, 5 Drawing Sheets

WEB APPLICATIONS INTERFACE SYSTEM IN A MOBILE-BASED CLIENT-SERVER SYSTEM

This application is a continuation of application Ser. No. 08/897,780 filed on Jul. 21, 1997 now abandoned.

FIELD OF THE INVENTION

The present invention pertains to methods and systems for providing access to internet servers and applications in a mobile-based client-server system.

BACKGROUND

In conventional client-server systems, respective "client stations," (e.g., computer terminals having one or more stored applications), periodically obtain information from a server (e.g., a centralized computer system operating in conjunction with one or more databases), in order to support one or more user applications residing on the client station. Such client-server systems have conventionally been restricted to high speed, hard-wired networks—e.g., coaxial, twisted pair, optical fiber, etc.

More recently, however, client-server system architectures have incorporated "mobile" client stations that are not hard-wired to a high speed network, e.g., such as portable (i.e., "laptop") computers equipped with modems for connecting to the server via a network connection. Such mobile-based system architectures, however, are usually provided over relatively low speed, high latency networks such as, e.g., a dial-up, circuit-switched telephone network. "Wireless" modems and networks are being employed to provide mobile connectivity of client stations to a remote server, albeit at a still slower rate and higher latency than even wire-based telephone networks. In particular, mobile-based client-server systems provided over wireless networks are growing in popularity as they allow for substantially increased client station mobility, without being tied to locations providing wire-based telephone network access.

In order to support software applications residing in such mobile-based client-server system architectures, however, a special mechanism such as a proprietary application programming interface ("API") must be used to "customize" the applications for compatibility with the applicable wireless transmission protocols. In many situations, developers will start with an application that has already been developed for a conventional network, and will rewrite the application using a proprietary API to thereby provide a "mobile-enabled" application.

It is this required use of special APIs that highlights the drawback to these prior systems. In particular, every new or existing application must be written (or rewritten) to invoke the APIs in order to provide compatibility for operating in conjunction with, e.g., a selected wireless transmission protocol. Further, these additional features and modifications to the application have to be made on both the client station and server sides of the system architecture. In some cases, this work could involve a significant amount of development effort and expense.

Internet or "web-based" applications are especially problematic in a mobile-based client-server system, since their use may involve the frequent pulling of information from the server side to a client station, which, e.g., in the case of a wireless communication link, can be relatively expensive to maintain and prone to frequent disconnects or signal fading. In particular, the constant maintenance of a wireless connection while small amounts of data are transferred can be cost prohibitive.

Thus, it is desirable to provide improved methods and system architectures for more efficiently supporting applications used in mobile-based client-server systems and, in particular, for supporting web-based applications for systems such as those employing wireless network connectivity between a remote server and a client station.

SUMMARY OF THE INVENTION

The present invention provides a mobile-based client-server system architecture that allows internet-based applications, such as conventional web-based applications, to operate transparently—i.e., without requiring specialized APIs.

In a preferred embodiment, two specialized software layers are provided in a mobile-based client server system—a specialized proxy layer that resides on a client station, and an agent (or "web agent") layer that resides on the server. More particularly, a conventional web browser residing on a mobile client station is configured to point to the proxy layer, which "captures" Hyper Text Transfer Protocol ("HTTP") messages that are transmitted to, and received from, the web browser. Within the proxy layer, the HTTP messages received from the web browser are packed into a selected communication transmission format, such as, e.g., a wireless transmission format, and then transmitted to a client station message handler.

In particular, the client station message handler acts as a communications interface for transmitting and receiving messages from and to the client station, wherein the outgoing packed messages are transmitted by the client station message handler to a similar message handler associated with the server. Notably, although the invention is most useful for increasing efficiency over relatively slow, high latency networks, such as, e.g., wireless networks, the communication link between the respective client station and server message handlers may in fact be any network configuration.

From the server message handler, the web agent captures the packed messages and recovers the original, (i.e., "raw") HTTP messages. The HTTP messages are then transmitted by the web agent to an appropriate web server for processing. Responsive HTTP messages (e.g., containing HTML, binary, java, or other types of information) transmitted from a respective web server are captured by the web agent, which packs the messages into the selected communication transmission format. The packed messages are then forwarded from the web agent to the server message handler for transmission to the client station.

At the client station, the received messages are forwarded to the proxy layer, which unpacks the individual HTTP messages from the communication transmission format, and forwards the recovered messages to the web browser for processing. In this manner, the respective client station proxy layer and server web agent provide for the transparent exchange of HTTP messages between the web browser and web server, regardless of the type of nature of the communication link between the respective entities.

In accordance with more particular aspects of the invention, the respective proxy and web agent layers may each be linked with respective memory caches and have intelligent filtering capabilities, thereby reducing the need for redundant, unnecessary, or otherwise unwanted messages.

By way of example, information received from the server may be duplicated by the proxy layer for storage in the client station's memory cache, or otherwise used to update previously stored information, prior to being transmitted to the web browser. Outgoing HTTP messages received from the web browser are then evaluated by the proxy to determine whether information requested therein is already present in the client station memory cache. If so, the responsive information is retrieved from the memory cache and sent to the browser, and the respective message(s) can be dropped without requiring transmission to the server.

In conjunction with this aspect of the invention, the web agent may "pre-fetch" information from a respective web server, based on the initial request data parameters, wherein the information is transmitted to the client station and stored in the memory cache until such time as the full request is made. In this manner, network bandwidth utilization may be made more efficient, while reducing transmission latency. Preferably, responsive messages from a web server are filtered (i.e., "dropped") by the web agent, if they contain information that exceeds a selected threshold quantity or type parameter associated with the recipient client station, e.g., based on byte size or transmission latency limitations.

Thus, it is a general object of the invention to provide a system and method for allowing any application that works under a conventional web browser to operate transparently as a mobile-enabled application—i.e., wherein no special development work is required due to the data transmission strictures for particular communication networks.

As will be apparent to those skilled in the art, other and further objects and advantages will appear hereinafter.

BRIEF DESCRIPTION OF THE DRAWINGS

The drawings illustrate both the design and utility of preferred embodiments of the present invention, in which.

DETAILED DESCRIPTION OF THE PREFERRED EMBODIMENTS

Figure 1:
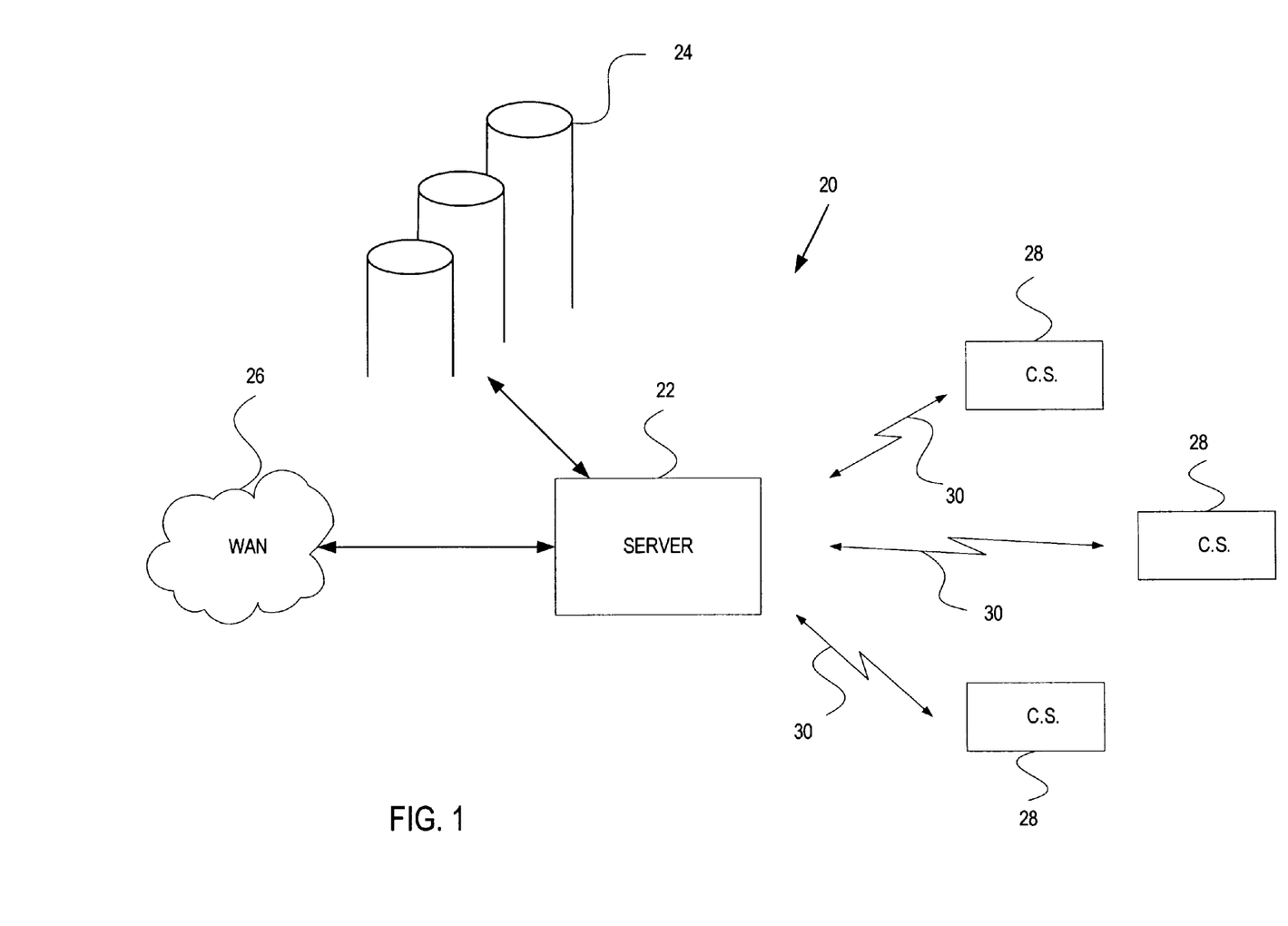
FIG. 1 is a simplified block diagram of an exemplary mobile-based client-server system, including a centralized server and a plurality of mobile-based client stations.

Referring to FIG. 1, an exemplary mobile-based client-server system 20, includes a centralized server system ("server") 22 that operates in conjunction with a plurality of data bases 24. The server 22 is also linked to multiple further servers (not shown) and databases (also not shown) via a local or wide area network ("LAN" or "WAN") 26. In this manner, the server 22, as well as any application programs residing thereon, may access any number of applications and stored information available through the network 26.

The server 22 is connected with a plurality of mobile client stations 28, which may comprise, e.g., suitable data terminals, laptop computers, or personal digital assistants ("PDAs") via a wireless communication network 30. In particular, the server 22, along with each mobile client station 28, is equipped or otherwise connected to its own respective wireless network transceiver (not shown), wherein a communication link between the server 22 and the respective client stations 28 may be established on demand.

Figure 2:
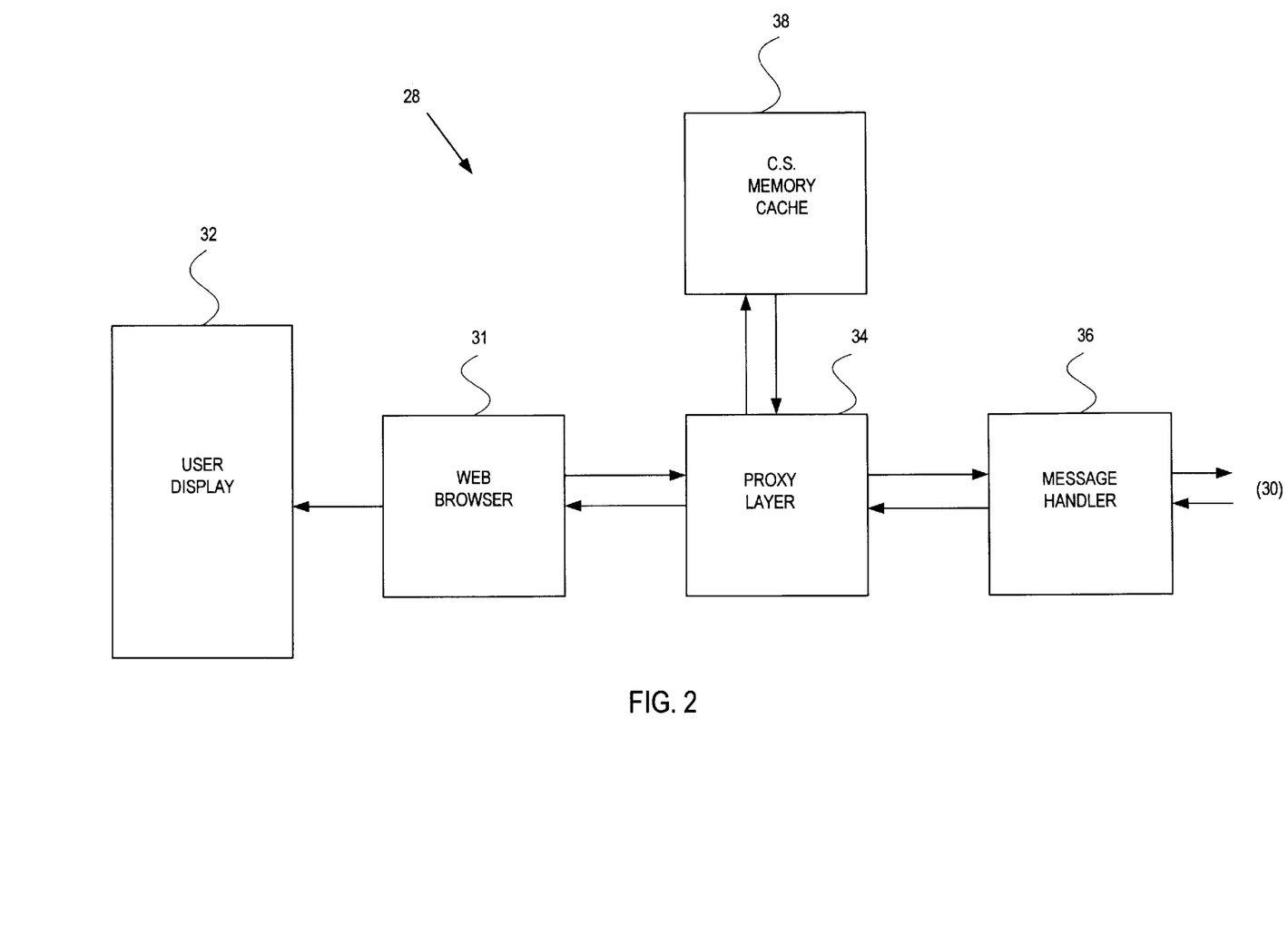
FIG. 2 is a simplified block diagram of a preferred data layer protocol flow in a client station of the client-server system of FIG. 1.

Referring to FIG. 2, a respective client station 28 has residing thereon a web browser application 31, which operates in conjunction with a user display 32. In accordance with a general aspect of the present invention, the client station 28 also has residing thereon a specialized proxy software layer 34. In particular, the web browser 31 is configured to point to the proxy 34, which "captures" HTTP messages containing information requests that are transmitted from the web browser 31, wherein the received HTTP messages are "packed" (i.e., reformatted) by the proxy 34 into a selected communication transmission format. Notably, when "packing" the HTTP messages received from the web browser 31, the proxy 34 may perform such functions as data compression or encoding, and additional information may also be added to the original messages. Further, the actual number of original HTTP messages contained in a packed transmission frame may vary, e.g., depending on the size and content of the underlying messages. Also, larger messages may be broken into smaller, segmented packets for transmission in the communication transmission format.

The packed HTTP messages are then forwarded by the proxy 34 to a message handler 36 residing on the client station 28. In particular, the client station message handler 36 acts as a communication gateway for the client station 28, transmitting the packed messages in a bandwidth efficient data stream over the wireless network 30 to a counterpart message handler 40 (seen in FIG. 3) associated with the server 22. Likewise, the server message handler 40 transmits downstream data comprising responsive HTTP messages packed in the communication transmission format to the client station message handler 36. The client station message handler 36 directs the received downstream packed HTTP messages to the proxy 34, which recovers the raw HTTP messages from the communication transmission format and forwards the recovered HTTP messages to the web browser 31.

In particular, the communication transmission format in which the HTTP messages are packed by the proxy is "selected" to conform with the communication link protocol established between the respective client station message handler 36 and server message handler 40, such as, e.g., the wireless network 30 in the illustrated preferred embodiment. By way of specific example, a presently preferred and commercially available client-server communication system is "Oracle Mobile Agents™," the operation of which is in accordance with a preferred system disclosed and described in commonly assigned U.S. patent application Ser. No. 08/521,660, filed Aug. 31, 1995, and now U.S. Pat. No. 5,850,517 entitled "A Mobile-Based Client-Server System," which is assigned to the assignee of the present invention and which is fully incorporated herein by reference.

In accordance with a more particular aspect of the invention, each HTTP message received from the web browser 31 is first evaluated by the proxy 34 to determine whether information requested therein is already present in a client station memory cache 38 associated with the client station 28. If so, the responsive information is retrieved from the memory cache 38 by the proxy 34 and immediately sent to the browser 31, and the respective HTTP message is filtered (i.e., discarded) without being packed and or forwarded to the message handler 36 for further transmission or, (more importantly), requiring a responsive transmission from the server 22. In this manner, transmission bandwidth over the communication network 30 is conserved and system response time improved. Of course, if information requested in a respective HTTP message is not found in the memory cache 38, the message is packed for upstream transmission to the server 22.

In further accordance with this aspect of the invention, information contained in the downstream HTTP messages received from the server 22 is preferably duplicated for storage in the memory cache 38, or otherwise used to update previously stored information, and then the received and recovered HTTP messages 33 are sent to the web browser 31. Preferably, the memory cache 38 is configured to delete information stored therein after a selected time interval, to insure that outdated information is not provided to the web browser 31. In a particular preferred embodiment, the web browser 31 has its own memory cache (not shown) and, thus, the information stored in the client station memory cache 38 can be deleted after each request is fully processed by the proxy 34.

In lieu of (or in addition to) this "time limit" practice, the client station proxy layer 34 may periodically transmit conditional request messages to the server 22, wherein an inquiry is made as to whether the pertinent information stored in the client station memory cache 38 has been changed or updated since it was last transmitted. If the information has been changed or updated, it is re-transmitted from the server 22 to the client station 28, where it is used to replace to the previous version stored in the memory cache 38. If it has not been changed or updated, no response to the conditional request is made by the server 22, and the existing information is kept in the client station memory cache 38.

Figure 3:
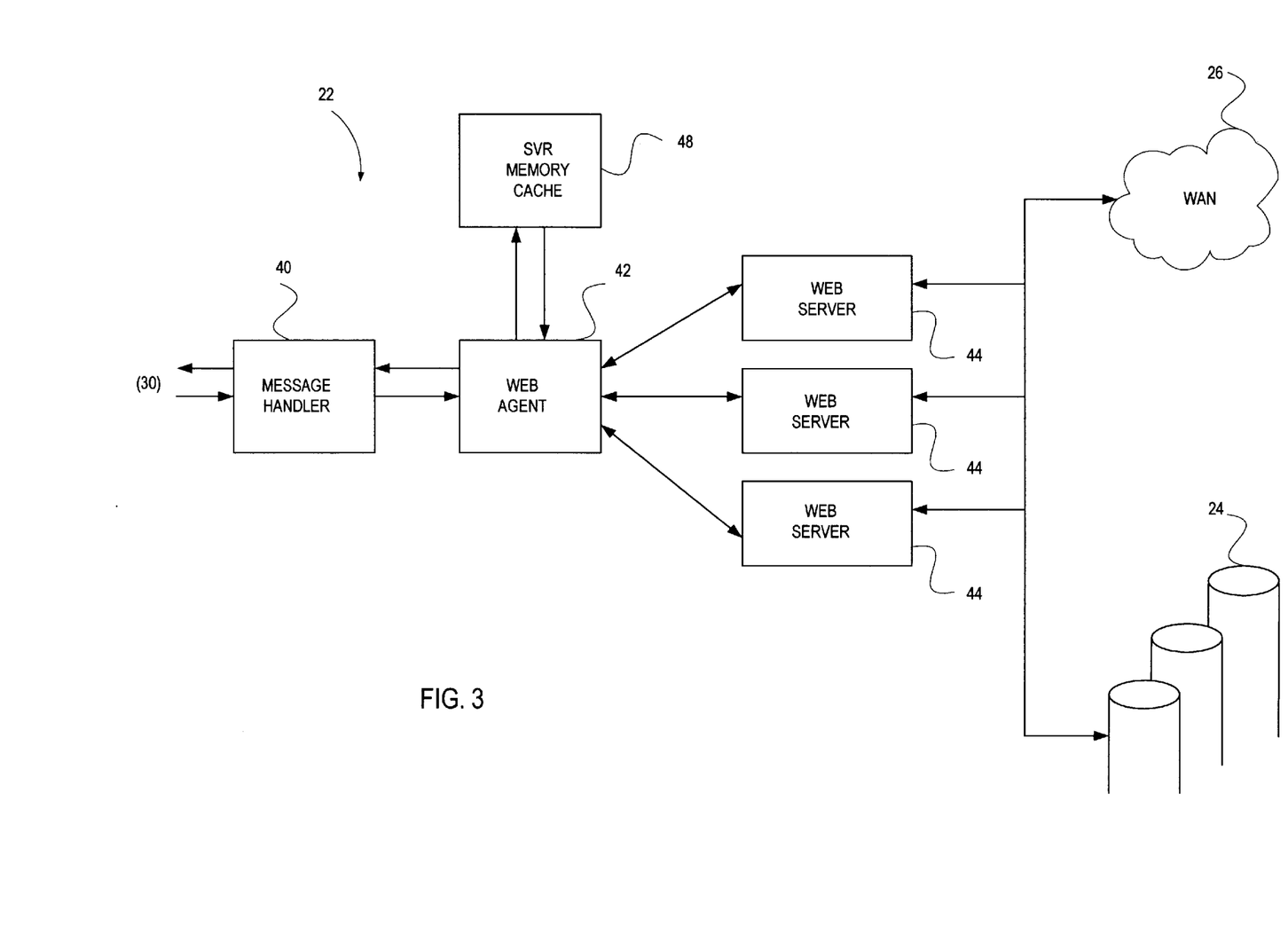
FIG. 3 is a simplified block diagram of a preferred data layer protocol flow in the server of the client-server system in FIG. 1.

Referring to FIG. 3, packed HTTP messages received by the server message handler 40 are forwarded to a specialized web agent software layer 42 residing on the server 22, which recovers the original (upstream) HTTP messages from the packed transmission format. The recovered HTTP messages are then transmitted by the web agent 42 to a respective web server application ("web server") 44, which may reside in the server system 22, or may be accessed over the network 26.

Responsive (i.e., "downstream") HTTP messages from the respective web server 44 are captured by the web agent 42, which packs the responsive HTTP messages within the selected communication transmission format. The packed messages are then forwarded to the server message handler 40 for downstream transmission to the client station message handler 36. In order to most efficiently utilize upstream bandwidth and limit costs, the web agent 42 is preferably configured to store the downstream HTTP messages received from the respective web servers 44, wherein a selected threshold of messages are "bundled" for collective transmission to the client station 28—i.e., based on type, quantity and/or size of the information to be transmitted.

In accordance with a still further aspect of the invention, HTTP messages received from a web server 44 in response to a request of a client station 28 are preferably evaluated by the respective web agent 42 to determine what further information is likely to be requested in ensuing requests from the client station 28. This information is then "pre-fetched" from the respective web server 44 by the web agent 42 and transmitted to the client station 28 for storage in the client station memory cache 38.

For example, the web agent 42 will parse through the HTML text of an initially requested web site to thereby determine what further images will be asked for in ensuing requests (i.e., to complete the web site). Rather than wait for the specific further requests from the client station 22, the web agent 42 itself initiates the requests on the respective web server 44, thereby improving the overall response time of the system 20.

Intelligent filtering capabilities are also preferably provided at both the server 22 and respective client stations 28, wherein a user (i.e., of a client station 22) or system administrator (i.e., of the server 22) may set limits on the type and/or quantity of images that may be pre-fetched. For example, in order to reduce transmission bandwidth costs and latency, a client station user may include with its request message a stated limitation on the type and/or quantity of images that are be transferred in response.

Preferably, a system administrator could impose selected limits on a client station-by-client station basis, whereby the web agent 42 would filter any responsive messages from a respective web server 44 that exceed a selected threshold quantity or type parameter associated with the respective client station 28. In accordance with this aspect of the invention, a "placeholder" may be transmitted to the client station in lieu of the requested objects, (e.g., and displayed on the user display 32 in place of the filtered image or text) whereby the client may conveniently use the placeholder to override the filter, if so desired and otherwise authorized as part of the system configuration.

As will be apparent to those skilled in the art, filtering of the initial information requests can also be made at the client station 28. For example, a certain type of client station 28 may be capable of processing text data, but not images. In this case, in order to avoid unnecessary transmission costs and delay, the client station would preferably have a filter set to drop requests for imaging data before they are transmitted to the server 22. By way of a further example, the type of information requests could be limited to data pertinent to the business of the system owner. In at least one preferred embodiment, overrides of a request filter could be entered by a user (e.g., via a security code, or the like). Notably, such intelligent filtering capability can be extended to govern the response to all information requested from the server.

In accordance with a still further, more particular aspect of the invention, the web agent 42 is configured to store information contained in downstream messages transmitted from the respective web servers 44 in an associated server memory cache 48, whereby the information can be more readily transmitted to multiple requesting client stations 28. Such an arrangement is especially useful in situations where multiple client stations 28 in the same client-server system must simultaneously access and utilize information from the same web server 44.

In this regard, information contained in downstream HTTP messages received from a respective web server 44 is also duplicated for storage in the server memory cache 48, or otherwise used to update previously stored information. As information requests are received from any of the client stations 28 in the system 20, the web agent 42 first determines whether the requested information is already present in the server memory cache 48. If so, the information is retrieved from the memory cache 48 by the web agent 42, and transmitted to the respective client station 28, without requiring further processing.

As with the respective client station memory cache 38, the server memory cache 48 is preferably configured to either update or otherwise delete information stored therein after a selected time interval, to insure that outdated information is not provided to a client station 28.

Figure 4:
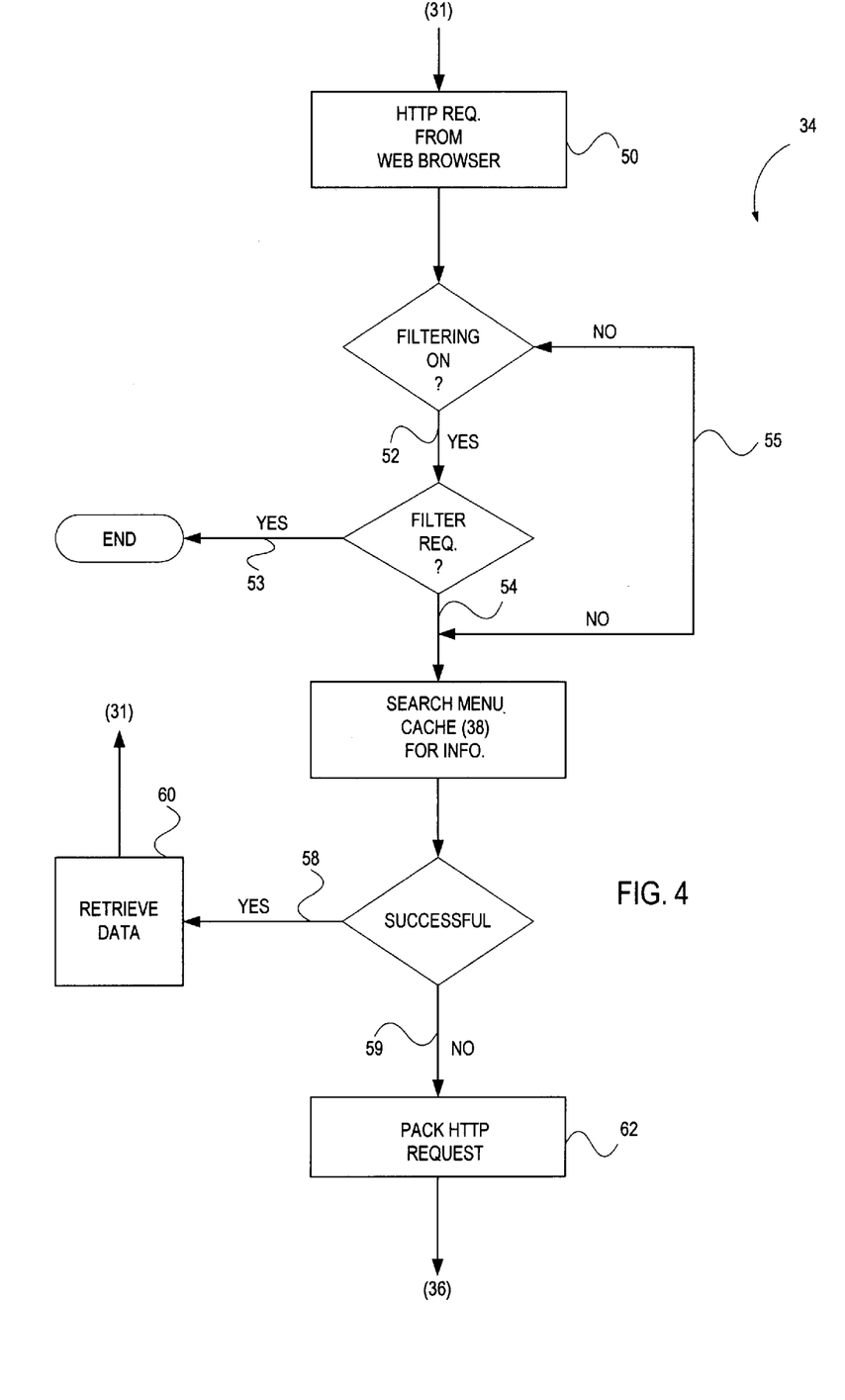
FIG. 4 is a flow chart depicting a preferred protocol for the processing of request messages by a specialized proxy layer residing on the client station.

Referring to FIG. 4, for purposes of further illustration, a preferred message process flow through the proxy layer 34 of a client station 28 is as follows:

1. An HTTP message requesting information ("requests") is received 50 by the proxy layer 34 from the web browser 31.
2. If request filtering is activated (or "ON") 52, the information requested within the message is compared to selected type and/or quantity threshold values: if the requested information exceeds any of the threshold values 53, the request message is dropped.
3. If the requested information does not exceed any of the filtering values 54, or if filtering is not activated 55, the proxy conducts a search 56 to determine whether the requested information is present in the client station memory cache 38.
4. If the search 56 of the memory cache 38 is successful 58, the responsive information is retrieved 60 from the memory cache 38, and forwarded to the web browser 31.
5. If the search 56 of the memory cache 38 is not successful 59, the request message is packed 62 into the selected communication transmission format and forwarded to the client station message handler 36 for transmission to the server 22.

Figure 5:
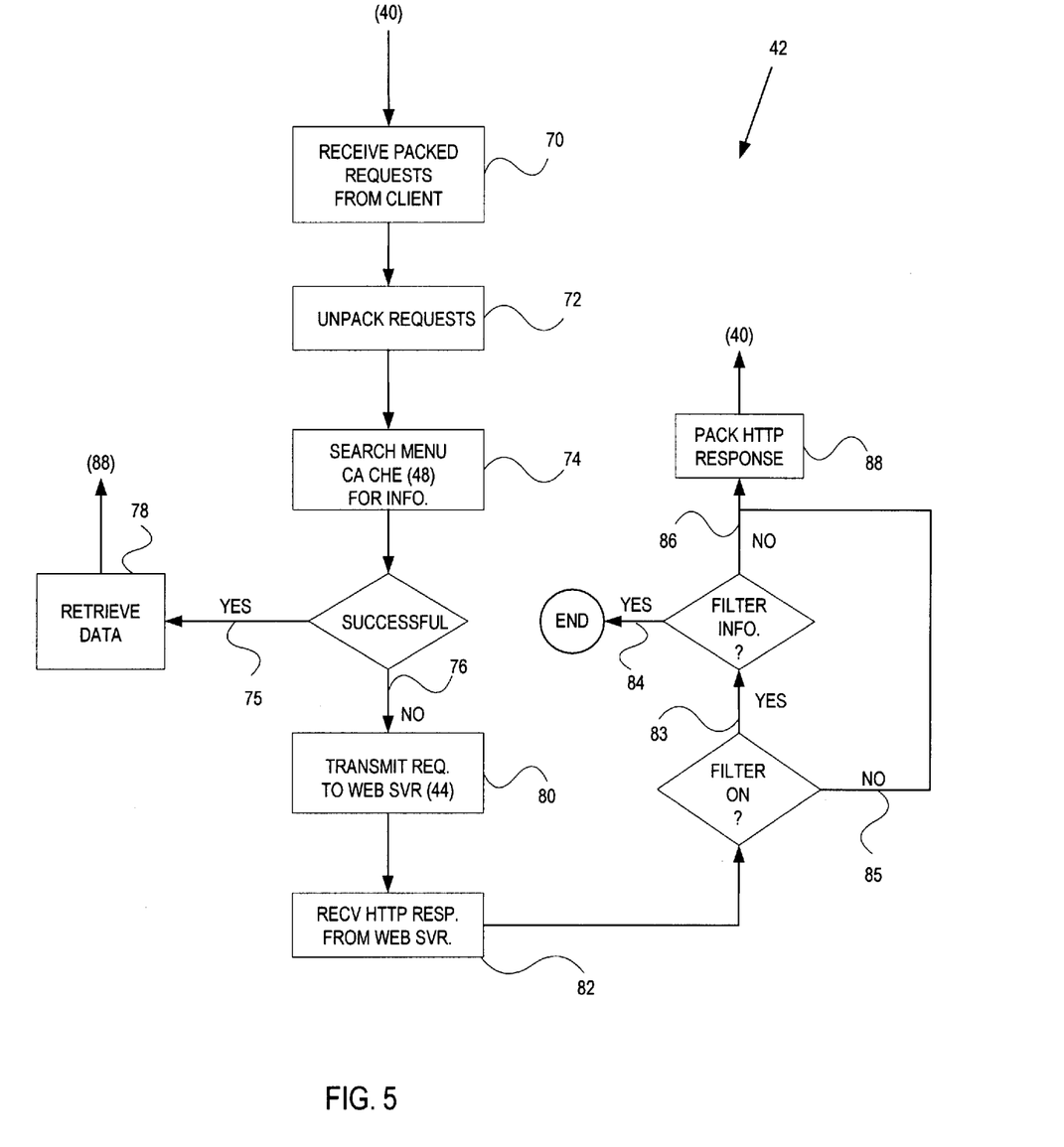
FIG. 5 is a flow chart depicting a preferred protocol for the processing of request and response messages by a specialized agent layer residing on the server.

Referring to FIG. 5, a preferred message process flow through the web agent 42 at the server 22 is as follows:

1. A "packed" HTTP request message is received 50 by the web agent 42 from the server message handler 40.
2. The message is "unpacked" 72, thereby recovering the "raw" HTTP request.
3. The agent conducts a search 74 to determine whether the requested information is present in the server memory cache 48.
4. If the search 74 of the memory cache 48 is successful 75, the responsive information is retrieved 78 from the memory cache 48, packed 88 into the selected communication transmission format, and forwarded to the server message handler 40 for transmission to the client station 28.
5. If the search 74 of the memory cache 48 is not successful 76, the request message is transmitted 80 to an applicable web server 44.
6. A responsive HTTP message is received 82 by the web agent 42 from the web server 44.
7. If response filtering is activated (or "ON") 83, the responsive information is compared to selected type and/or quantity threshold values: if the information exceeds any of the threshold values 84, the response message is dropped. In a preferred embodiment, the client station 28 is then notified that the particular item was filtered.
8. If the responsive information does not exceed any of the filtering values 86, or if filtering is not activated 85, the responsive information is packed 88 into the selected communication transmission format, and forwarded to the server message handler 40 for transmission to the client station 28.

While embodiments and applications of this invention have been shown and described, as would be apparent to those skilled in the art, many more modifications and applications are possible without departing from the inventive concepts herein.

For example, while particularly useful for mobile-based client-server systems employing a relatively low speed, high latency wireless network to establish communication links between the server and respective client stations, the advantages of improving efficiency over the client-server communication link and in eliminating the need for specialized APIs as provided by the inventive concepts disclosed and described herein may be obtained in client-server systems using any type of network architecture—e.g., telephonic dial-up or even a high speed LAN connection—wherein raw HTTP message transmission is not possible or is otherwise impractical.

Thus, the scope of the disclosed inventions is not to be restricted except in the spirit of the appended claims.

What is claimed:

1. A method for transmitting information between an application residing on a client station and a server, comprising the steps of:

transmitting upstream messages from the application to a proxy residing on the client station, the upsteam messages containing an immediate information request;

packing the upstream messages from the application to a proxy residing on the client station;

transmitting the packed upstream messages from the proxy to a message handler residing on the client station;

transmitting downstream messages that are packed in the selected communication transmission format from the client station message handler to the proxy, the downstream messages containing information responsive to the immediate information request and prefetched information not directly responsive to the immediate information request, and said prefetched information responsive to an anticipated future information request;

unpacking the downstream messages at the proxy; transmitting the unpacked downstream messages from the proxy to the application; and periodically transmitting a request message to said server to determine if a client version of a set of information stored in a memory cache at the client station is different from a server version of the set of information at the server as a result of a change to the set of information since the set of information was last transmitted to the client station, wherein the set of information is validly maintained in the memory cache at the client station if the set of information is identified as being changed and the client version of the set of information is used to respond to an information request, and wherein the set of information in the memory cache is invalidated if the set of information is identified as being changed and the client version of the set of information is not used to respond to the information request.

2. The method of claim 1, comprising the further steps of:

evaluating the upstream messages at the proxy to determine whether information requested therein is already present in said memory cache at the client station;

transmitting information stored in the memory cache to the application if it is responsive to a request contained in an upstream message; and packing only those upstream messages containing requests for information not stored in the memory cache into the selected communication transmission format.

3. The method of claim 2, comprising the further step of:

storing information contained in at least some of the downstream messages in the memory cache.

4. The method of claim 1, comprising the further steps of:

transmitting the packed messages from the client station message handler to a message handler associated with the server via a selected communication network;

transmitting the packed messages from the server message handler to an agent associated with the server;

unpacking the incoming messages at the agent; and transmitting the unpacked messages from the agent to the server.

5. The method of claim 4, comprising the further step of:

evaluating the upstream messages at the agent to determine whether they contain a conditional request for information.

6. The method of claim 5, comprising the further step of:

dropping messages containing requests for information already transmitted from the server to the client station.

7. The method of claim 4, comprising the further steps of:

transmitting downstream messages from the server to the agent;

packing the downstream messages at the agent into the selected communication transmission format;

transmitting the packed downstream messages from the agent to the server message handler; and transmitting the packed downstream messages from the server message handler to the client station message handler.

8. The method of claim 7, comprising the further step of:

evaluating messages at the agent to determine the type and quantity of information being transmitted from the server to the client station.

9. The method of claim 8, comprising the further step of:

bundling a selected quantity of stored downstream messages at the agent for collective transmission from the agent to the server message handler.

10. The method of claim 1, further comprising the step of:

responding to said immediate information request by transmitting a placeholder in lieu of a requested information item.

11. The method of claim 1 in which the set of information in the memory cache is replaced with the server version of the set of information if a determination is made that the set of information has changed since last being transmitted to the client station.

12. The method of claim 1 in which the server version of the set of information is transmitted to the memory cache if a determination is made that the set of information has changed since last being transmitted to the client station.

13. The method of claim 1 in which the prefetched information responsive to an anticipated future information request is used to complete a displayed web page.

14. A computer readable medium having executable code to execute a process for transmitting information between an application residing on a client station and a server, the process comprising the steps of:

transmitting upstream messages from the application to a proxy residing on the client station, the upsteam messages containing an immediate information request;

packing the upstream messages from the application to a proxy residing on the client station;

transmitting the packed upstream messages from the proxy to a message handler residing on the client station;

transmitting downstream messages that are packed in the selected communication transmission format from the client station message handler to the proxy, the downstream messages containing information responsive to the immediate information request and prefetched information not directly responsive to the immediate information request, and said prefetched information responsive to an anticipated future information request;

unpacking the downstream messages at the proxy;

transmitting the unpacked downstream messages from the proxy to the application; and periodically transmitting a request message to said server to determine if a client version of a set of information stored in a memory cache at the client station is different from a server version of the set of information at the server as a result of a change to the set of information since the set of information was last transmitted to the client station, wherein the set of information is validly maintained in the memory cache at the client station if the set of information is identified as being changed and the client version of the set of information is used to respond to an information request, and wherein the set of information in the memory cache is invalidated if the set of information is identified as being changed and the client version of the set of information is not used to respond to the information request.

15. The computer readable medium of claim 14, comprising the further steps of:

evaluating the upstream messages at the proxy to determine whether information requested therein is already present in said memory cache at the client station;

transmitting information stored in the memory cache to the application if it is responsive to a request contained in an upstream message; and packing only those upstream messages containing requests for information not stored in the memory cache into the selected communication transmission format.

16. The computer readable medium of claim 15, comprising the further step of:

storing information contained in at least some of the downstream messages in the memory cache.

17. The computer readable medium of claim 14, comprising the further steps of:

transmitting the packed messages from the client station message handler to a message handler associated with the server via a selected communication network;

transmitting the packed messages from the server message handler to an agent associated with the server;

unpacking the incoming messages at the agent; and transmitting the unpacked messages from the agent to the server.

18. The computer readable medium of claim 17, comprising the further step of:

evaluating the upstream messages at the agent to determine whether they contain a conditional request for information.

19. The computer readable medium of claim 18, comprising the further step of:

dropping messages containing requests for information already transmitted from the server to the client station.

20. The computer readable medium of claim 17, comprising the further steps of:

transmitting downstream messages from the server to the agent;

packing the downstream messages at the agent into the selected communication transmission format;

transmitting the packed downstream messages from the agent to the server message handler; and transmitting the packed downstream messages from the server message handler to the client station message handler.

21. The computer readable medium of claim 20, comprising the further step of:

evaluating messages at the agent to determine the type and quantity of information being transmitted from the server to the client station.

22. The computer readable medium of claim 21, comprising the further step of:

bundling a selected quantity of stored downstream messages at the agent for collective transmission from the agent to the server message handler.

23. The computer readable medium of claim 14, further comprising the step of: responding to said immediate information request by transmitting a placeholder in lieu of a requested information item.

24. The computer readable medium of claim 14 in which the set of information in the memory cache is replaced with the server version of the set of information if a determination is made that the set of information has changed since last being transmitted to the client station.

25. The computer readable medium of claim 14 in which the server version of the set of information is transmitted to the memory cache if a determination is made that the set of information has changed since last being transmitted to the client station.

26. The computer readable medium of claim 14 in which the prefetched information responsive to an anticipated future information request is used to complete a displayed web page.

27. A system for transmitting information between an application residing on a client station and a server, comprising:

means for transmitting upstream messages from the application to a proxy residing on the client station, the upsteam messages containing an immediate information request;

means for packing the upstream messages from the application to a proxy residing on the client station;

means for transmitting the packed upstream messages from the proxy to a message handler residing on the client station;

means for transmitting downstream messages that are packed in the selected communication transmission format from the client station message handler to the proxy, the downstream messages containing information responsive to the immediate information request and pre-fetched information not directly responsive to the immediate information request, and said pre-fetched information responsive to an anticipated future information request;

means for unpacking the downstream messages at the proxy;

transmitting the unpacked downstream messages from the proxy to the application; and means for periodically transmitting a request message to said server to determine if a client version of a set of information stored in a memory cache at the client station is different from a server version of the set of information at the server as a result of a change to the set of information since the set of information was last transmitted to the client station, wherein the set of information is validly maintained in the memory cache at the client station if the set of information is identified as being changed and the client version of the set of information is used to respond to an information request, and wherein the set of information in the memory cache is invalidated if the set of information is identified as being changed and the client version of the set of information is not used to respond to the information request.

28. The system of claim 27, further comprising:

means for evaluating the upstream messages at the proxy to determine whether information requested therein is already present in said memory cache at the client station;

means for transmitting information stored in the memory cache to the application if it is responsive to a request contained in an upstream message; and means for packing only those upstream messages containing requests for information not stored in the memory cache into the selected communication transmission format.

29. The system of claim 28, further comprising:

means for storing information contained in at least some of the downstream messages in the memory cache.

30. The system of claim 27, further comprising:

means for transmitting the packed messages from the client station message handler to a message handler associated with the server via a selected communication network;

means for transmitting the packed messages from the server message handler to an agent associated with the server;

means for unpacking the incoming messages at the agent; and means for transmitting the unpacked messages from the agent to the server.

31. The system of claim 30, further comprising:

means for evaluating the upstream messages at the agent to determine whether they contain a conditional request for information.

32. The system of claim 31, further comprising:

means for dropping messages containing requests for information already transmitted from the server to the client station.

33. The system of claim 30, further comprising:

means for transmitting downstream messages from the server to the agent;

means for packing the downstream messages at the agent into the selected communication transmission format;

means for transmitting the packed downstream messages from the agent to the server message handler; and means for transmitting the packed downstream messages from the server message handler to the client station message handler.

34. The system of claim 33, further comprising:

means for evaluating messages at the agent to determine the type and quantity of information being transmitted from the server to the client station.

35. The system of claim 34, further comprising:

means for bundling a selected quantity of stored downstream messages at the agent for collective transmission from the agent to the server message handler.

36. The system of claim 27, further comprising:

means for responding to said immediate information request by transmitting a placeholder in lieu of a requested information item.

37. The system of claim 27 in which the set of information in the memory cache is replaced with the server version of the set of information if a determination is made that the set of information has changed since last being transmitted to the client station.

38. The system of claim 27 in which the server version of the set of information is transmitted to the memory cache if a determination is made that the set of information has changed since last being transmitted to the client station.

39. The system of claim 27 in which the prefetched information responsive to an anticipated future information request is used to complete a displayed web page.

* * * * *